United States Patent
Ando et al.

(10) Patent No.: US 7,635,306 B2
(45) Date of Patent: Dec. 22, 2009

(54) TRIPOD TYPE CONSTANT VELOCITY JOINT

(75) Inventors: Atsushi Ando, Kariya (JP); Isashi Kashiwagi, Kariya (JP); Mitsunori Nakamura, Toyama (JP); Hiroyuki Sawaki, Toyama-ken (JP)

(73) Assignees: Jtekt Corporation, Osaka-shi (JP); Nachi - Fujikoshi Corporation, Toyama-shi (JP)

( * ) Notice: Subject to any disclaimer, the term of this patent is extended or adjusted under 35 U.S.C. 154(b) by 378 days.

(21) Appl. No.: 11/617,237

(22) Filed: Dec. 28, 2006

(65) Prior Publication Data

US 2007/0155515 A1    Jul. 5, 2007

(30) Foreign Application Priority Data

Dec. 28, 2005    (JP) .............................. 2005-379466

(51) Int. Cl.
 *F16D 3/205*    (2006.01)
(52) U.S. Cl. ....................... 464/111; 464/905
(58) Field of Classification Search ................. 464/111, 464/132, 905; 384/561
See application file for complete search history.

(56) References Cited

U.S. PATENT DOCUMENTS

| | | | |
|---|---|---|---|
| 4,558,962 A | * | 12/1985 | Meinlschmidt ......... 384/561 X |
| 5,591,085 A | | 1/1997 | Stall et al. |
| 6,375,576 B1 | * | 4/2002 | Margerie ................ 464/111 |
| 6,572,481 B1 | * | 6/2003 | Margerie ................ 464/111 |
| 2001/0005694 A1 | | 6/2001 | Olszewski |
| 2004/0110568 A1 | | 6/2004 | Hofmann |
| 2006/0079336 A1 | | 4/2006 | Ando et al. |
| 2006/0116210 A1 | | 6/2006 | Kashiwagi et al. |
| 2006/0205522 A1 | | 9/2006 | Ichikawa et al. |

FOREIGN PATENT DOCUMENTS

| | | |
|---|---|---|
| DE | 198 34 513 A1 | 2/2000 |
| DE | 102 46 169 A1 | 4/2004 |
| JP | 7-151158 | 6/1995 |
| JP | 2753956 | 3/1998 |
| JP | 2000-220655 | 8/2000 |

* cited by examiner

*Primary Examiner*—Greg Binda
(74) *Attorney, Agent, or Firm*—Oblon, Spivak, McClelland, Maier & Neustadt, L.L.P.

(57) ABSTRACT

A compact tripod type constant velocity joint with double roller type roller units capable of preventing plastic deformation of snap rings in assembling. In each of the roller units, an outer roller has an inner diameter 'Do' of 26.4 mm or less. The inner diameter 'Do' (mm) of the outer roller, a groove depth 'Depth' (mm) of engaging grooves formed on the outer roller and an outer diameter 'Ds' (mm) of the snap rings satisfy the formula below. Then, in a state where the snap rings are seated in the engaging grooves, diametrical gaps of 0.1 mm or more are formed between outer peripheral ends of the snap rings and groove bottoms of the engaging groove.

$$Do + 2 \times Depth - Ds \geq 0.1.$$

4 Claims, 3 Drawing Sheets

TRIPOD TYPE CONSTANT VELOCITY JOINT

FIELD OF THE INVENTION

The present invention relates to a tripod type constant velocity joint with an inner member having three trunnions.

BACKGROUND OF THE INVENTION

A tripod type constant velocity joint comprises an inner member having three trunnions, an outer member having three guide grooves, and three roller units respectively disposed rotatably between the trunnions and the guide grooves. These roller units are classified into what are called a single roller type and a double roller type. The single roller type roller unit comprises needle bearings disposed rotatably on an outer periphery of a trunnion, and an outer roller disposed on an outer periphery of the needle bearings so as to be capable of rolling in a guide groove (See Japanese Unexamined Patent Publication (KOKAI) No. 2000-220655, for instance) On the other hand, the double roller type roller unit comprises an inner roller disposed rotatably and swingably on an outer periphery of a trunnion, an outer roller disposed in a guide groove so as to be capable of rolling, and needle bearings disposed between the inner roller and the outer roller (See Japanese Patent No. 2753956, for instance). That is to say, the double roller type roller unit can swing with respect to the trunnion.

Snap rings are employed to secure the roller unit components in place. In the case of the single roller type roller unit, the snap rings are secured to the trunnion. This is because the roller unit moves only axially with respect to the trunnion and does not swing with respect to the trunnion. On the other hand, in the case of the double roller type roller unit, since the inner roller swings with respect to the trunnion, the snap rings cannot be secured to the trunnion. Therefore, in the case of the double roller type roller unit, the snap rings are secured to the outer roller. Namely, the outer roller has engaging grooves on its inner circumferential surface and the snap rings are fitted in these engaging grooves.

By the way, when a shaft to which a constant velocity joint is connected has a small diameter, there is a demand for downsizing the constant velocity joint. In the tripod type constant velocity joint employing the double roller type roller units, however, the snap rings to be fitted in the engaging grooves of the inner circumferential surface of the outer roller make it difficult to downsize the constant velocity joint. When the snap rings are fitted into the engaging grooves of the inner circumferential surface of the outer roller, first the diameters of the snap rings have to be reduced. As the snap rings have a smaller diameter, the ratio of a diameter shrinkage to the original diameter of the snap rings becomes larger. Therefore, there is a fear that stress placed on the snap rings might exceed yield stress and that the snap rings might be plastically deformed. As a result, the snap rings might be unable to return to their original diameters and engagement widths of the engaging grooves of the inner circumferential surface of the outer roller and the snap rings might become small. If thus the engagement widths become small, in some cases the snap rings may come off the outer roller.

Therefore, when there is a risk that the above problem will occur, it is conventional to use a constant velocity joint suitable to be connected to a larger-diameter shaft. For example, when a tripod type constant velocity joint employing the double roller type roller units is used for a vehicular power transmission shaft having an outer diameter of 19 mm or less, it is conventional to use a constant velocity joint suitable for a power transmission shaft having an outer diameter of more than 19 mm.

SUMMARY OF THE INVENTION

The present invention has been conceived in view of these circumstances. It is an object of the present invention to provide a compact tripod type constant velocity joint with double roller type roller units capable of preventing plastic deformation of snap rings in assembling.

A tripod type constant velocity joint of the present invention comprises an outer member, an inner member and three roller units. The outer member has three guide grooves formed on its inner circumferential surface and extending in an axial direction of the outer member. The inner member is disposed inside the outer member and has a boss portion and three trunnions extending radially from the boss portion and to be respectively inserted into the guide grooves. Each of the roller units comprises an inner roller having a hollow cylindrical shape and supported rotatably by a respective one of the trunnions; an outer roller having a hollow cylindrical shape, engaged with a respective one of the guide grooves so as to be capable of rolling, and having an engaging groove on its inner circumferential surface; a needle bearing disposed between the inner roller and the outer roller so as to be capable of rolling; and a snap ring having a C shape, to be fitted into the engaging groove and engaged with the inner roller and the needle bearing in an axial direction of the outer roller unit.

The tripod type constant velocity joint of the present invention is characterized in that the outer roller has an inner diameter of 26.4 mm or less and that the outer roller and the snap ring satisfy Formula 1 below.

$$Do + 2 \times \text{Depth} - Ds \geq 0.1 \qquad (1)$$

where Do is an inner diameter (mm) of the outer roller, Ds is an outer diameter (mm) of the snap ring and Depth is a groove depth (mm) of the engaging groove.

Here, the outer roller having an inner diameter of 26.4 mm corresponds to an outer roller constituting a constant velocity joint of the size most suitable for a shaft having an outer diameter of 19 mm. The shaft of this size has conventionally been difficult to be connected to a tripod type constant velocity joint with double roller type roller units. The relationship of Formula 1 between the outer roller and the snap ring can also be expressed as a relationship in which a diametrical gap of 0.1 mm or more is formed between an outer peripheral end of the snap ring and a groove bottom of the engaging groove when the snap ring is seated in the engaging groove.

By the way, conventionally there has been little gap between the outer peripheral end of the snap ring and the groove bottom of the engaging groove. Namely, in present invention, a gap is formed in a part where no gap has been formed conventionally. In other words, the engaging groove of the present invention has a greater groove depth than the conventional ones. As a result, though conventionally the snap ring has been plastically deformed in assembling, in the present invention the snap ring can be prevented from being plastically deformed in assembling.

Moreover, it is preferable that the outer roller and the snap ring satisfy Formula 2 below.

$$(Ds - Do)/2 \geq 0.65 \qquad (2)$$

That is to say, when the center of the snap ring is aligned with the center of the engaging groove, the engagement width of the snap ring and the engaging groove is 0.65 mm or more.

Here, for example, when a tripod type constant velocity joint is connected to a vehicular power transmission shaft (an intermediate shaft, for instance) having an outer diameter of 19 mm or less, limit force to the snap ring's coming off the engaging groove is 3.84 kN. This limit force is attributable to a frictional force between the trunnion and the inner roller. The present inventors have found that if Formula 2 above is satisfied, the limit force of 3.84 kN can be satisfied. Namely, the snap ring can be securely prevented from coming off the engaging groove by satisfying Formula 2 above.

Moreover, it is preferable that the outer roller and the snap ring satisfy Formula 3 below.

$$Do + Depth < Ds \quad (3)$$

In a state where the snap ring is seated in the engaging groove, this allows all the periphery of the snap ring to be securely inserted in the engaging groove even if the center of the snap ring is misaligned with the center of the engaging groove. Namely, all the periphery of the snap ring is engaged with the engaging groove. Therefore, the snap ring is more securely prevented from coming off the engaging groove.

It is also preferable that the inner roller has a cut-away portion on its outer circumferential end surface and that an inner peripheral surface of the snap ring is engaged with the cut-away portion in a perpendicular direction to the axial direction of the roller unit. Namely, in a state where the snap ring is seated in the engaging groove, the inner peripheral surface of the snap ring is engaged with the cut-away portion. This engagement restricts a shift length between the center of the snap ring and the center of the engaging groove. Accordingly, the engaging width of the snap ring and the engaging groove is appropriately secured over the entire periphery.

As mentioned above, the tripod type constant velocity joint of the present invention has the following advantages. The snap ring can be securely prevented from being plastically deformed in assembling. Therefore, even though the tripod type constant velocity joint is compact and has double roller type roller units, the snap ring can be prevented from coming off the engaging groove. Namely, the compact tripod type constant velocity joint with double roller type roller units can be used for a power transmission shaft having an outer diameter of 19 mm or less.

BRIEF DESCRIPTION OF THE DRAWINGS

The exact nature of this invention, as well as other objects and advantages thereof, will be readily apparent from consideration of the following description relating to the accompanying drawings in which:

FIG. 3 is a view for explaining a step of fitting a snap ring 34 in an engaging groove 32a.

DETAILED DESCRIPTION OF THE PREFERRED EMBODIMENTS

Now, the present invention will be described in more detail using preferred embodiments. Here, a tripod type constant velocity joint of a first preferred embodiment will be described, for instance, as being used for coupling vehicular power transmission shafts. More specifically, this joint will be described as being used as a joint between a shaft connected to a transmission and an intermediate shaft or a joint between the intermediate shaft and a shaft to be connected to a differential gear. Particularly, this joint will be described as being used for an intermediate shaft having an outer diameter of 19 mm or less.

Figure 1:
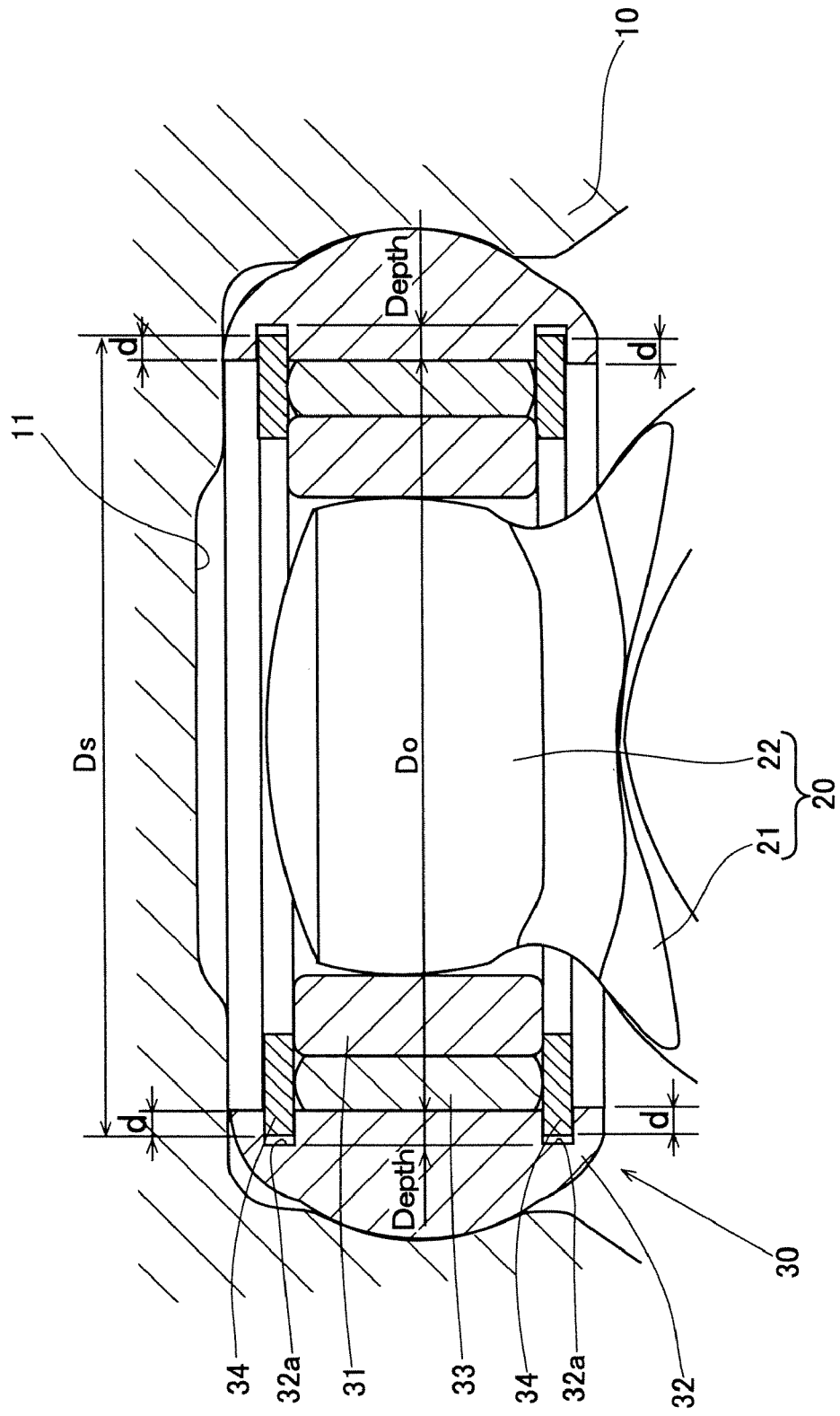
FIG. 1 is a cross sectional view of a part of a tripod type constant velocity joint of a first preferred embodiment of the present invention in a radial direction of a shaft axis.

This tripod type constant velocity joint will be described with reference to FIG. 1. FIG. 1 shows a cross sectional view of a part of the tripod type constant velocity joint in a radial direction of a shaft axis. This tripod type constant velocity joint comprises an outer member 10 to be connected to a shaft (not shown) on one side, an inner member 20 to be connected to a shaft (not shown) on the other side (an intermediate shaft), and roller units 30 disposed between the outer member 10 and the inner member 20.

The outer member 10 has a hollow cylindrical shape with a closed end and the closed end is connected to the shaft on the one side. The hollow cylindrical portion of the outer member 10 has three guide grooves 11 formed on its inner circumferential surface and extending in an axial direction of the hollow cylindrical portion (i.e., an axial direction of the shaft and a perpendicular direction to the plane of FIG. 1). It is to be noted that FIG. 1 shows only one guide groove 11.

The inner member 20 is disposed inside the hollow cylindrical portion of the outer member 10. The inner member 20 comprises a boss portion 21 having an annular shape and to be connected to the shaft on the other side (the intermediate shaft), and three trunnions 22 extending from the outer periphery of the boss portion 21 in a radially outward direction. The trunnions 22 are respectively inserted in the guide grooves 11 of the outer member 10.

Each of the roller units 30 has an annular shape as a whole. Each of the roller units 30 is disposed on the outer periphery of each of the trunnions 22 rotatably and swingably, and disposed in each of the guide grooves 11 so as to be capable of rolling. Each of the roller units 30 comprises an inner roller 31, an outer roller 32, a plurality of needle rollers 33 and two snap rings 34.

The inner roller 31 has a hollow cylindrical shape and is supported rotatably and swingably by a respective one of the trunnions 22. The outer roller 32 has a hollow cylindrical shape. An outer circumferential surface of the outer roller 32 has a shape conforming to that of a respective one of the guide grooves 11. Therefore, the outer roller 32 is engaged with the respective one of the guide grooves 11 so as to be capable of rolling around an axis extending in a vertical direction of FIG. 1. Furthermore, an inner circumferential surface of the outer roller 32 has two engaging grooves 32a one on a radial outside (the upper side of FIG. 1) and the other on a radial inside (the lower side of FIG. 1). The separation distance between these two engaging grooves 32a is almost the same as the axial length of the inner roller 31 mentioned above and the axial length of the needle rollers 33 which will be mentioned later. The outer roller 32 has an inner diameter Do of 26.4 mm. The tripod type constant velocity joint with outer rollers 32 having an inner diameter Do of 26.4 mm or less corresponds to a tripod type constant velocity joint of a size suitable for an intermediate shaft having an outer diameter of 19 mm or less. The respective needle rollers 33 have a thin cylindrical shape and are disposed between the inner roller 31 and the outer roller 32 so as to be capable of rolling with respect to the inner roller 31 and the outer roller 32.

Figure 3:
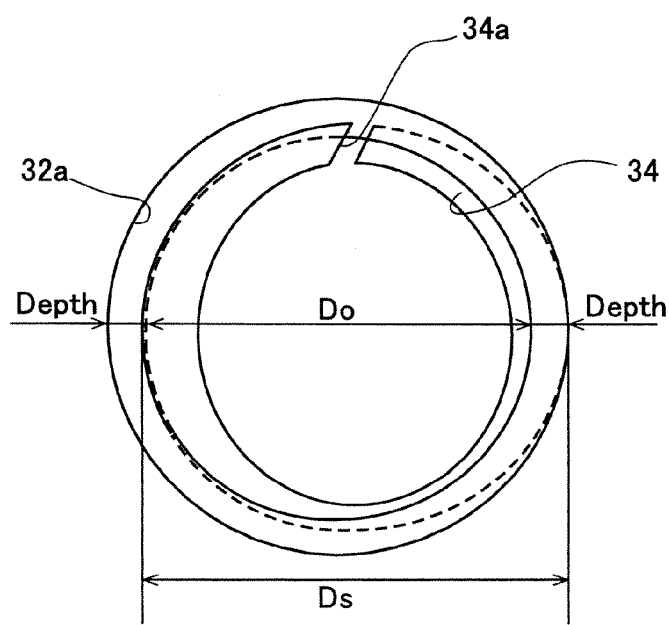

Each of the snap rings 34 has a C shape with a cut-away portion 34a, as shown in FIG. 3. Namely, the snap rings 34 are shaped to permit reduction in diameter. These snap rings 34 are respectively fitted in the engaging grooves 32a and engaged with the inner roller 31 and the needle rollers 33 in an axial direction of the roller unit 30 (the vertical direction of FIG. 1). Namely, the snap rings 34 are components for preventing the inner roller 31 and the needle rollers 33 from dislocated from the inside of the outer roller 32 to the upper side or lower side of FIG. 1.

Next, the relationship between the inner diameter 'Do' of the outer roller 32, the groove depth 'Depth' of the engaging grooves 32a, and the outer diameter 'Ds' of the snap rings 34 will be described. First, Do, Depth and Ds satisfy Formulas 1 to 3 just below.

$$Do+2\times Depth-Ds \geqq 0.1 \quad (1)$$

$$(Ds-Do)/2 \geqq 0.65 \quad (2)$$

$$Do+Depth<Ds \quad (3)$$

where Do is an inner diameter (mm) of the outer roller 32, Ds is an outer diameter (mm) of the snap rings 34 and Depth is a groove depth (mm) of the engaging grooves 32a.

According to Formula 1, in a state where the snap rings 34 are seated in the engaging grooves 32a, diametrical gaps of 0.1 mm or more are formed between the outer peripheral ends of the snap rings 34 and the groove bottoms of the engaging grooves 32a. Namely, when the centers of the engaging grooves 32a are aligned with the centers of the snap rings 34, gaps of 0.05 mm or more are formed between the outer peripheral ends of the snap rings 34 and the groove bottoms of the engaging grooves 32a over the entire peripheries.

According to Formula 2, when the centers of the engaging grooves 32a are aligned with the centers of the snap rings 34, the engaging widths d of the snap rings 34 and the engaging grooves 32a are 0.65 mm or more over the entire peripheries.

Figure 2:
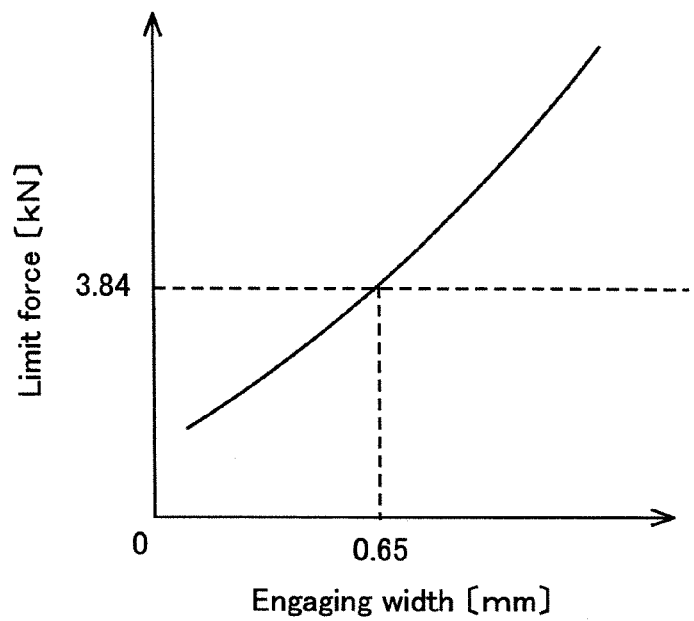
FIG. 2 shows a relationship between the engaging width d [mm] and the limit force [kN] to a snap ring 34's coming off an engaging groove 32a when the constant velocity joint of the first preferred embodiment is connected to an intermediate shaft having an outer diameter of 19 mm.

Here, the relationship of Formula 2 will be described in detail with reference to FIG. 2. FIG. 2 shows a relationship between the engaging width d [mm] and the limit force [kN] to a snap ring 34's coming off an engaging groove 32a when the constant velocity joint of this preferred embodiment is connected to an intermediate shaft having an outer diameter of 19 mm. Here, the limit force is force which is necessary for the snap ring 34 to come off the engaging groove 32a when the force is applied to the snap ring 34 in a vertical direction of FIG. 1. More specifically, rotation of the constant velocity joint generates a frictional force between a trunnion 22 and an inner roller 31 in axial directions of the roller unit 30 (in vertical directions of FIG. 1). Due to this frictional force, the inner roller 31 and the needle rollers 33 tend to move relative to the outer roller 32 in the axial directions of the roller unit 30. Therefore, the inner roller 31 and the needle rollers 33 press the snap rings 34 in the axial directions of the roller unit 30. The pressure which the inner roller 31 and the needle rollers 33 exert on the snap rings 34 is a pressure to make the snap rings 34 come off the engaging grooves 32a. The minimum pressure exerted when a snap ring 34 comes off an engaging groove 32 is limit force.

As shown in FIG. 2, as the engaging width d becomes smaller, the limit force becomes smaller. When the engaging width d is 0.65 mm, the limit force is 3.84 kN. Here, the limit force of 3.84 kN is the limit force required minimally when a tripod type constant velocity joint is connected to an intermediate shaft having an outer diameter of 19 mm. Namely, when a tripod type constant velocity joint is connected to an intermediate shaft having an outer diameter of 19 mm or less, necessary conditions for securing the limit force can be satisfied by securing the engaging width d of 0.65 mm or more. That is to say, the snap rings 34 can be prevented from coming off the engaging grooves 32a by securing the engaging width d of 0.65 mm or more.

Moreover, because of the relationship of Formula 1 above, the centers of the engaging grooves 32a are sometimes misaligned with the centers of the snap rings 34 by 0.05 mm or more. Even if these centers are misaligned with each other, as long as Formula 3 is satisfied, at least a part of each snap ring 34 is inserted in each engaging groove 32a over the entire periphery. Namely the snap rings 34 are always securely engaged with the engaging grooves 32a over the entire peripheries. Thereby the snap rings 34 can be prevented from coming off the engaging grooves 32a.

Next, a step of fitting a snap ring 34 into an engaging groove 32a will be described with reference to FIG. 3. FIG. 3 is a view for explaining a step of fitting the snap ring 34 into the engaging groove 32a and illustrates the snap ring 34 and the engaging groove 32a.

Here, the snap ring 34 has a C shape with a cut-away portion 34a. First, as shown in FIG. 3, about half the circumference of the snap ring 34 from one peripheral end is inserted into the engaging groove 32a. At this time, about half the circumference of the snap ring 34 from the one peripheral end is inserted into the vicinity of a groove bottom of the engaging groove 32a. Second, the snap ring 34 is reduced in diameter until the entire outer periphery of the remaining part of the snap ring 34, which has not been inserted in the engaging groove 32 yet, is located inside an inner circumferential surface of an outer roller 32. This diameter shrinkage S (mm) of the snap ring 34 is expressed by Formula 4 below.

$$S \geqq Ds-(Do+Depth) \quad (4)$$

Third, with the diameter of the snap ring 34 reduced, the remaining part of the snap ring 34 which has not been inserted in the engaging groove 32 yet is moved to the position of the engaging groove 32a. Finally, the snap ring 34 is released from the diameter-reduced state and the whole of the snap ring 34 is fitted into the engaging groove 32a.

Here, according to Formula 4, as the groove depth 'Depth' of the engaging groove 32a becomes greater, the minimum value of the diameter shrinkage S becomes smaller. Conventionally, the outer diameter Ds of the snap ring 34 is almost the same as the maximum separation distance of the annular engaging groove 32a (=Do+2×Depth). Namely, the groove depth 'Depth' of the engaging groove 32a of this preferred embodiment is greater than those of the conventional engaging grooves. Namely, in this preferred embodiment, the minimum value of the diameter shrinkage S of the snap ring 34 is smaller than those of the conventional snap rings.

Namely, since the minimum value of the diameter shrinkage S of the snap ring 34 can be smaller, stress acting on the snap ring 34 is smaller when the snap ring 34 is fitted into the engaging groove 32a. Particularly when the outer roller 32 has an inner diameter Do of 26.4 mm or less, if the groove depth 'Depth' of the engaging groove 32a satisfies Formula 1, the stress acting on the snap ring 34 can be smaller than yield stress. Namely, the snap ring 34 can be prevented from being plastically deformed.

As described above, the snap ring 34 can be fitted into the engaging groove 32a without being plastically deformed. Moreover, the snap ring 34 can be securely prevented from coming off the engaging groove 32a.

Figure 4:
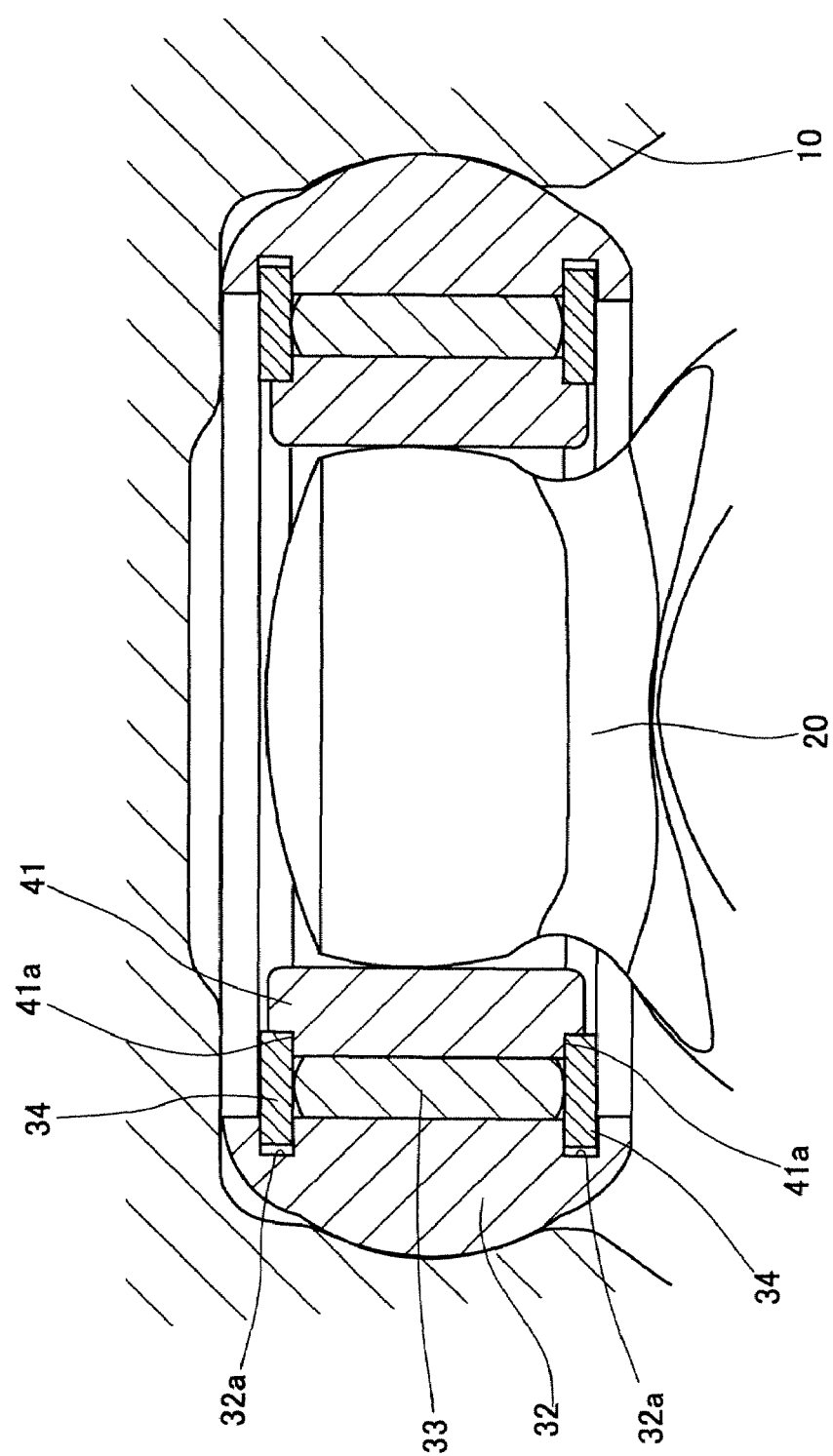
FIG. 4 is a cross sectional view of a part of a tripod type constant velocity joint having inner rollers of another preferred embodiment of the present invention in a radial direction of a shaft axis.

It should be noted that in the first preferred embodiment, the inner roller 31 has a hollow cylindrical shape having a uniform thickness and a length in an axial direction of the roller unit 30 which is almost the same as the separation distance between the two engaging grooves 32a, but the present invention is not limited to the construction described above. A part of a tripod type constant velocity joint having inner rollers 41 of another preferred embodiment is shown in FIG. 4. As shown in FIG. 4, one inner roller 41 has a hollow cylindrical shape as a whole. The inner roller 41 has a greater length in an axial direction of the roller unit 30 than the separation distance of the two engaging grooves 32a. The inner roller 41 has two cut-away portions 41a on its outer circumference and at both axial ends thereof. Inner peripheral portions of the snap rings 34 are respectively disposed on these cut-away portions 41a. Namely, the inner peripheral surfaces of the snap rings 34 are engaged with the cut-away portions 41a in a perpendicular direction to the roller unit 30 axis (in a horizontal direction of FIG. 4).

Namely, in a state where the snap rings 34 are seated in the engaging grooves 32a, since the inner peripheral surfaces of the snap rings 34 are respectively engaged with the cut-away portions 41a, the shift lengths of the centers of the snap rings 34 and the centers of the engaging grooves 32a are restricted. Accordingly, the engaging widths d of the snap rings 34 and the engaging grooves 32a are appropriately secured over the entire peripheries.

Obviously, many modifications and variations of the present invention are possible in the light of the above teachings. It is therefore to be understood that within the scope of the appended claims, the invention may be practiced otherwise than as specifically described.

What is claimed is:

1. A tripod type constant velocity joint comprising:
    an outer member having three guide grooves formed on its inner circumferential surface and extending in an axial direction of said outer member;
    an inner member disposed inside said outer member and having a boss portion and three trunnions extending radially from said boss portion and to be respectively inserted into said guide grooves; and
    three roller units, each comprising:
        an inner roller having a hollow cylindrical shape and supported rotatably by a respective one of said trunnions;
        an outer roller having a hollow cylindrical shape, engaged with a respective one of said guide grooves so as to be capable of rolling, and having an engaging groove on its inner circumferential surface;
        a needle bearing disposed between said inner roller and said outer roller so as to be capable of rolling; and
        a snap ring having a C shape having a cutaway portion, to be fitted into said engaging groove and engaged with said inner roller and said needle bearing in an axial direction of said roller unit, said outer roller having an inner diameter of 26.4 mm or less, and said outer roller and said snap ring satisfying the formula:

$$Do + 2 \times \text{Depth} - Ds \geqq 0.1 \quad (1)$$

where Do is an inner diameter (mm) of said outer roller, Ds is an outer diameter (mm) of said snap ring and Depth is a groove depth (mm) of said engaging groove.

2. A tripod type constant velocity joint as set forth in claim 1, wherein said outer roller and said snap ring further satisfy the formula:

$$(Ds-Do)/2 \geqq 0.65.$$

3. A tripod type constant velocity joint as set forth in claim 1, wherein said outer roller and said snap ring further satisfy the formula:

$$Do + \text{Depth} < Ds.$$

4. A tripod type constant velocity joint as set forth in claim 1, wherein said inner roller has a cut-away portion on its outer circumferential end surface, and an inner peripheral surface of said snap ring is engaged with said cut-away portion in a perpendicular direction to said axial direction of said roller unit.

* * * * *